(12) United States Patent
Tremelling et al.

(10) Patent No.: US 11,923,643 B2
(45) Date of Patent: Mar. 5, 2024

(54) ELECTRICAL POWER CABLE

(71) Applicant: ABB Schweiz AG, Baden (CH)

(72) Inventors: Darren Tremelling, Apex, NC (US);
Pietro Cairoli, Cary, NC (US); Debrup Das, Fremont, CA (US)

(73) Assignee: ABB SCHWEIZ AG, Baden (CH)

( * ) Notice: Subject to any disclaimer, the term of this patent is extended or adjusted under 35 U.S.C. 154(b) by 107 days.

(21) Appl. No.: 17/380,514

(22) Filed: Jul. 20, 2021

(65) Prior Publication Data
US 2022/0021164 A1   Jan. 20, 2022

Related U.S. Application Data

(63) Continuation of application No. PCT/US2020/042728, filed on Jul. 20, 2020.

(51) Int. Cl.
*H01R 13/713* (2006.01)
*H02H 3/02* (2006.01)

(52) U.S. Cl.
CPC ......... *H01R 13/7135* (2013.01); *H02H 3/021* (2013.01)

(58) Field of Classification Search
CPC ................. H01R 13/7135; H01R 24/28; H01R 2201/10; H02H 3/021; H02H 7/0822; H01B 9/00; H02G 15/02
USPC ............................................ 361/115
See application file for complete search history.

(56) References Cited

U.S. PATENT DOCUMENTS

| | | | |
|---|---|---|---|
| 4,144,551 A | 3/1979 | Smith et al. | |
| 4,678,254 A | 7/1987 | Le Magourou | |
| 5,239,438 A * | 8/1993 | Echtler | H02H 3/33 361/63 |
| 5,245,219 A * | 9/1993 | Romatzick, Jr | H02H 11/00 307/130 |
| 9,007,186 B1 | 4/2015 | Krummey et al. | |
| 20,180,076 | 3/2018 | Thrush et al. | |
| 2004/0062022 A1 | 4/2004 | Sakiyama et al. | |
| 2004/0248462 A1 | 12/2004 | Dyer et al. | |
| 2004/0266230 A1 | 12/2004 | Chiran et al. | |
| 2005/0191897 A1 | 9/2005 | Kondou et al. | |
| 2008/0062003 A1 | 3/2008 | Paetz | |

(Continued)

FOREIGN PATENT DOCUMENTS

| | | |
|---|---|---|
| EP | 2251941 | 11/2010 |
| EP | 3184352 | 6/2017 |

OTHER PUBLICATIONS

Deziel, C. " Size of Wire & Circuit Breaker for Electric Stove"; Publication [online]. Nov. 7, 2019 (Nov. 7, 2019) [retrieved Sep. 28, 2020]. Retrieved from the Internet: <URL: https://www.hunker.com/13414122/size-of-wire-circuit-breaker-for-electric-stove>; entire document.

(Continued)

*Primary Examiner* — Danny Nguyen
(74) *Attorney, Agent, or Firm* — Greenberg Traurig, LLP (57) ABSTRACT

An electrical power cable is provided with two ends and an elongated length therebetween. The cable includes one or more conductors for conducting electrical power from a power source to an electrical load. One end includes a switch and a relay to provide electrical power to the electrical load and to disconnect an electrical contact from the power conductor.

20 Claims, 6 Drawing Sheets

(56) References Cited

U.S. PATENT DOCUMENTS

| | | | |
|---|---|---|---|
| 2011/0029144 A1* | 2/2011 | Muller | B60L 53/305 |
| | | | 700/298 |
| 2011/0068733 A1 | 3/2011 | Duda | |
| 2012/0242168 A1 | 9/2012 | Tsai et al. | |
| 2013/0322017 A1* | 12/2013 | Muller | B60L 53/16 |
| | | | 361/690 |
| 2014/0240888 A1 | 8/2014 | Song et al. | |
| 2018/0076616 A1 | 3/2018 | Thrush et al. | |
| 2019/0189378 A1* | 6/2019 | Lagree | H02G 5/08 |
| 2019/0237916 A1 | 8/2019 | Siegler | |
| 2020/0130521 A1* | 4/2020 | Ichikawa | B60L 3/00 |

OTHER PUBLICATIONS

International Search Report and Written Opinion, PCT Appln. Serial No. PCT/US20/42728, dated Oct. 13, 2020, 12 pgs.

* cited by examiner

ELECTRICAL POWER CABLE

BACKGROUND

The present inventions relate generally to electrical power, and more particularly, to supplying electrical power to electrical loads.

Supplying power throughout a manufacturing facility can be challenging due to routing concerns, the number of cables involved, controlling power to equipment, and safety concerns. Typically, a variety of disparate solutions have been provided to address these concerns individually. However, it would be desirable to provide improved solutions for routing electrical power throughout manufacturing facilities. One such solution may include an electrical power cable with integrated power control features. This could provide the potential to simplify routing and reduce the number of cables needed in a manufacturing facility. Control functions may also be performed directly through the electrical power cable, and safety may also be improved. Another solution may be an electrification arrangement that utilizes a power supply bus to provide electrical power to a plurality of electrical loads.

SUMMARY

An electrical power cable is described for controlling electrical power supplied to the electrical contacts at one end of the cable. Switches may be provided in the end of the cable to allow the electrical contacts to conduct electrical power and to isolate the electrical contacts from the electrical power. One or more relays may be used to open and close the switches. The invention may also include any other aspect described below in the written description or in the attached drawings and any combinations thereof.

BRIEF DESCRIPTION OF SEVERAL VIEWS OF THE DRAWINGS

The invention may be more fully understood by reading the following description in conjunction with the drawings, in which.

DETAILED DESCRIPTION

Figure 1:
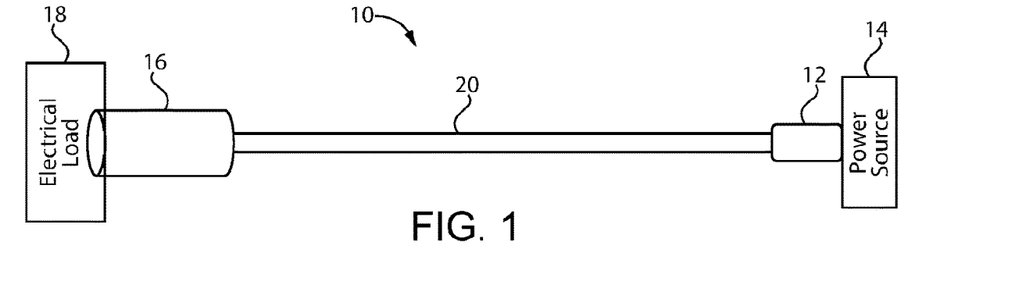
FIG. 1 is a schematic of an electrical power cable connected to a power source and an electrical load.
Figure 2:
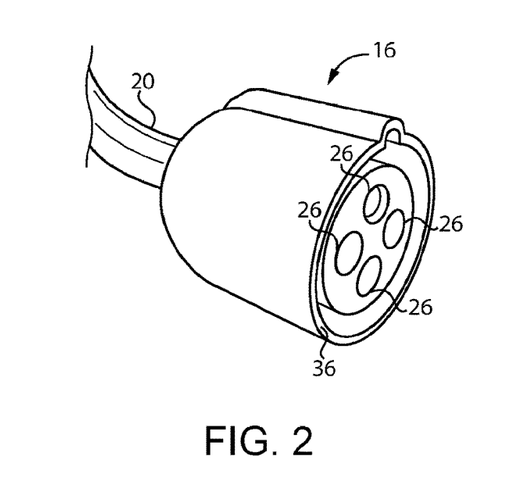
FIG. 2 is a perspective view of a second end of the electrical power cable.
Figure 3:
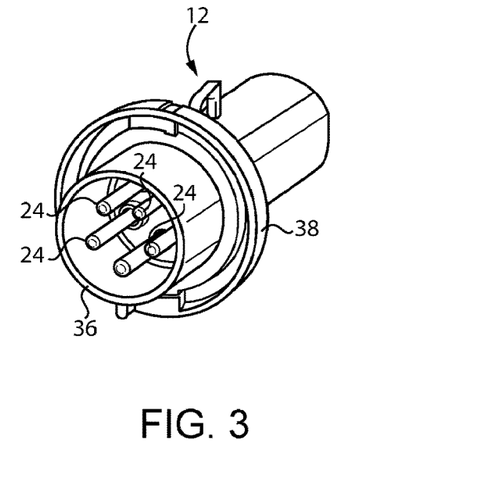
FIG. 3 is a perspective view of a first end of the electrical power cable.

As shown in FIG. 1, an electrical power cable 10 may be connected at a first end 12 to a power source 14 and may be connected at a second end 16 to an electrical load 18. An elongated length 20 extends between the first and second ends 12, 16 of the electrical power cable 10 which may be between at least 10 feet long and may be as long as 1,000 feet or longer. At least one power electrical conductor 22 for supplying electrical power from the power source 14 to the electrical load 18 extends along the elongated length 20 between the first and second ends 12, 16. It is understood that multiple power electrical conductors 22 may extend along the elongated length 20, as well as other lines, such as data lines 40, control lines 44, etc. It is also understood that an insulation layer surrounds the elongated length 20 and that individual conductors 22 and lines 40, 44 within the elongated length 20 are isolated from each other. The first and second ends 12, 16 each have a plurality of electrical contacts 24, 26 for connecting to the power source 14 and the electrical load 18, respectively. As shown in FIG. 2, the electrical contacts 24, 26 may be receptacles 26 which are connected to corresponding pins, or as shown in FIG. 3, the electrical contacts 24, 26 may be pins 24 which are connected to corresponding receptacles.

Figure 4:
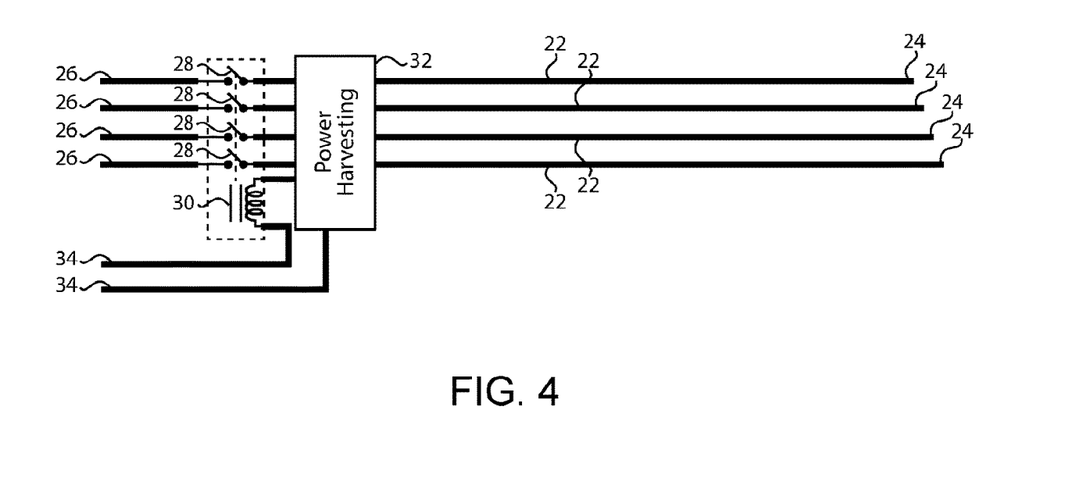
FIG. 4 is a schematic of one embodiment of the electrical power cable.

A schematic of one embodiment of the electrical power cable 10 is shown in FIG. 4. In this embodiment, as well as the embodiments of FIGS. 5-7, there are four power electrical conductors 22, where three of the conductors 22 are for different electrical phases of a three phase electrical power source and one conductor 22 is for the neutral. However, it is understood that different numbers of power electrical conductors 22 are possible. At the first end 12 of the cable 10, it is possible for the power electrical conductors 22 to be directly connected to respective first electrical contacts 24 for connecting to the power source 14. Thus, the first electrical contacts 24 conduct electrical power from the power source 14 to the respective power electrical conductors 22. However, at the second end 16, a switch 28 is provided between each of the power electrical conductors 22 and the respective second electrical contacts 26. Thus, the second electrical contacts 26 conduct electrical power from the respective power electrical conductors 22 and the electrical load 18 when the switches 28 are closed. On the other hand, when the switches 28 are open, the second electrical contacts 26 are left electrically uncharged even when the first end 12 is connected to the power source 14 and the power electrical conductors 22 along the elongated length 20 are electrically charged with electric power.

In order to control the switches 28, one or more relays 30 are also provided in the second end 16 of the electrical power cable 10. The relay 30 closes the switches 28 in order to conduct electrical power from the power electrical conductors 22 to the respective second electrical contacts 26 and the electrical load 18 when the second end 16 is connected to the electrical load 18. On the other hand, the relay 30 opens the switches 28 in order to isolate the electrical power conducted by the power electrical conductors 22 from the respective second electrical contacts 26 when the second end 16 is disconnected from the electrical load 18. Thus, when the second end 16 is disconnected from the electrical load 18, the second electrical contacts 26 are uncharged. This provides improved safety by preventing operators or nearby equipment from inadvertently contacting electrically charged, disconnected contacts 26 at the second end 16 of the electrical power cable 10. Possible electrical arcs from the second electrical contacts 26 may also be prevented. It is understood that while a single relay 30 could be used to operate multiple switches 28 as shown in the figures, it may also be possible for each switch 28 to be operated by a separate relay 30 if desired. The relay 30 may be an electrical mechanical relay or a solid-state relay as desired.

In one embodiment as shown in FIG. 4, power for the relay 30 may be harvested from one or more of the power electrical conductors 22 by a coil or other power harvesting arrangement 32 so that separate power need not be supplied to the cable 10 to operate the relay 30. The relay 30 may be controlled in a number of ways. For example, the second end 16 may be provided with a pair of third electrical contacts 34 that are connected to the electrical load 18 when the second end 16 is connected to the load 18. The electrical load 18 may be provided with a circuit that interconnects the third electrical contacts 34 when the second end 16 is connected to the electrical load 18. Thus, when the electrical load 18 interconnects the pair of third electrical contacts 34, the power harvesting circuit 32 is able to power the relay 30 to close the switches 28. It is understood that the electrical load 18 may also be provided with logic to control the operation of the relay 30 through the one or more third electrical contacts 34. It may also be desirable for the third electrical contacts 34 to connect with the electrical load 18 after the second electrical contacts 26 connect to the electrical load 18 to ensure that the switches 28 are only closed after a connection has been made between the second electrical contacts 26 and the electrical load 18. For example, the third electrical contacts 34 may be made shorter than the second electrical contacts 26 so that the second electrical contacts 26 connect with the electrical load 18 before the third electrical contacts 34.

The electrical power cable 10 is preferably designed for manufacturing, industrial and other heavy-duty, critical applications. Thus, the electrical power conducted through the cable 10 is preferably between 1 and 400 amps, and more preferably, between 20 and 200 amps. The second end 16, and also the first end 12, are also preferably molded onto the ends of the elongated length 20 so that the first and second ends 12, 16 are permanently attached to the elongated length 20 and cannot be assembled onto the elongated length 20 in the field. Thus, in the case of the second end 16, the molded body 16 embeds the switches 28, relay 30, power harvester 32, wireless receiver 42, etc. such that they are encased within the material of the body 16 and are not exposed to the surrounding environment. It may also be preferable for the first and/or second electrical contacts 24, 26 (e.g., pins or receptacles) to be laterally surrounded by an insulated sleeve 36 to further prevent inadvertent access to the contacts 24, 26. A threaded connector 38 may also be provided at the first and/or second end 12, 16 to securely connect the ends 12, 16 to the power source 14 and/or electrical load 18 in order to prevent inadvertent disconnection.

Figure 5:
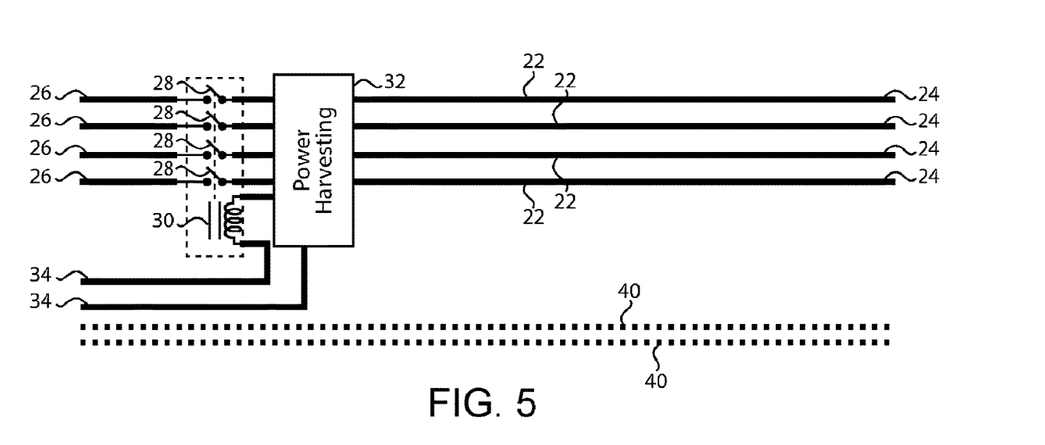
FIG. 5 is a schematic of another embodiment of the electrical power cable.
Figure 6:
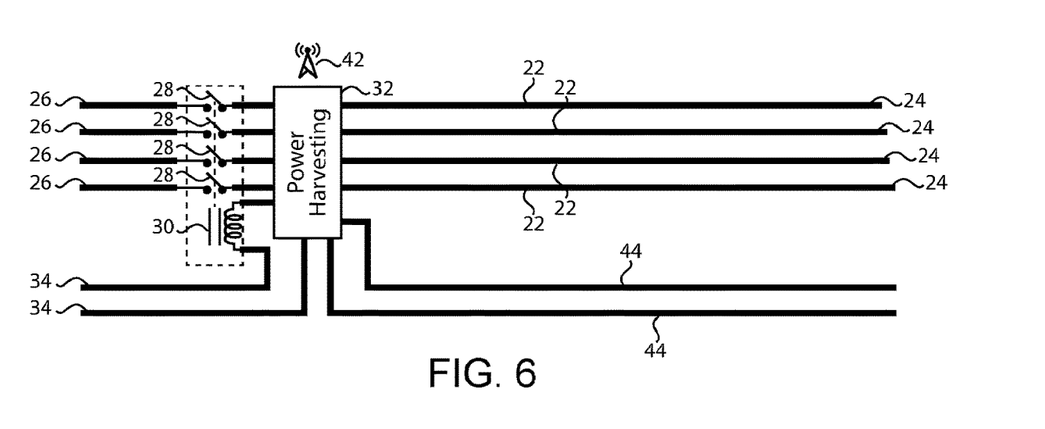
FIG. 6 is a schematic of another embodiment of the electrical power cable.
Figure 7:
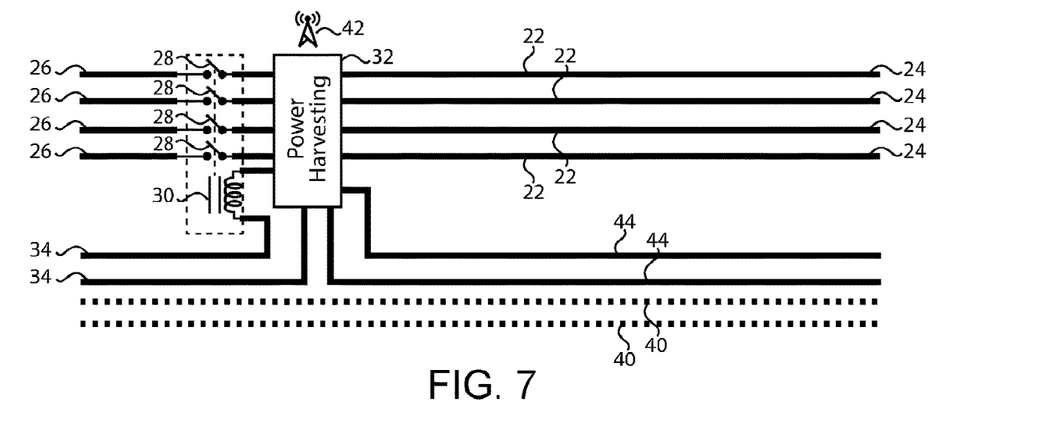
FIG. 7 is a schematic of another embodiment of the electrical power cable.

Turning to FIG. 5, it may also be desirable for the electrical power cable 10 to have one or more data lines 40 extending between the first and second ends 12, 16 with respective contacts to provide a data connection between the power source 14 and the electrical load 18. Although the data lines 40 may be used for various communication functions, it may be desirable to control the relay 30 in response to data exchanged between the power source 14 and the electrical load 18. For example, when the second end 16 is connected to the electrical load 18, the relay 30 may initially keep the switches 28 open such that power is not supplied to the load 18. In such an arrangement, the electrical load 18 and the power source 14 may first perform a handshake through the data line 40 to confirm that there is a connection between the power source 14 and the electrical load 18. Once a connection has been confirmed, the power source 14 may send a control signal over the data line 40 to close the relay 30 in order to provide power to the electrical load 18, or the electrical load 18 may be provided with logic to make such a determination. As noted above, the relay 30 may be controlled through the third electrical contact 34. As shown in FIG. 6, it is also possible to include a wireless receiver 42 in the second end 16. Thus, the wireless receiver 42 may also be used to control the relay 30 based on a control signal received from the power source 14, electrical load 18 or a remotely located controller. As shown in FIG. 7, the electrical power cable 10 may also be provided with one or more control lines 44 that extend from the first end 12 to the relay 30. The control line 44 may be used by the power source 14 to control the relay 30 directly and also may be useful in testing procedures where the control lines 44 are connected to a tester without the power electrical conductors 22 being connected to the power source 14.

It can be seen that the second end 16 can be used to ensure that electrical power is only conducted to the second electrical contacts 26 when the second end 16 is connected to the electrical load 18 and to ensure that the second electrical contacts 26 are electrically uncharged when the second end 16 is disconnected from the electrical load 18. It is also possible that the relay 30 and switches 28 may be used to perform other control functions as well, such as turning the electrical load 18 on and off in response to a controller and sensor inputs provided to the controller if desired.

Figure 8A:
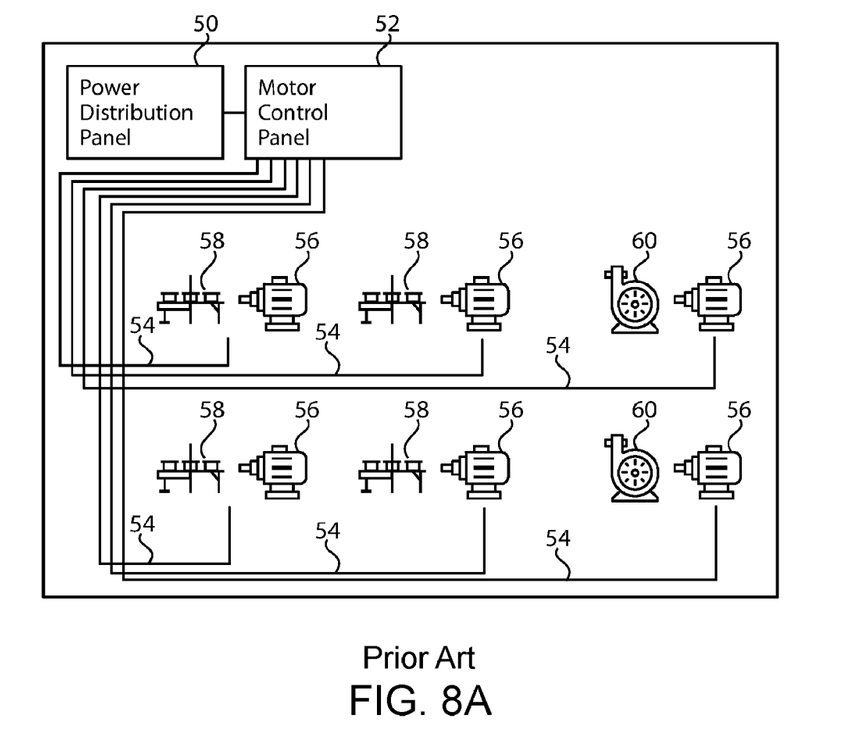
FIGS. 8A-B are schematics of a conventional electrification arrangement in an industrial plant and typical steps involved in adding a motor to such an arrangement.
Figure 8B:
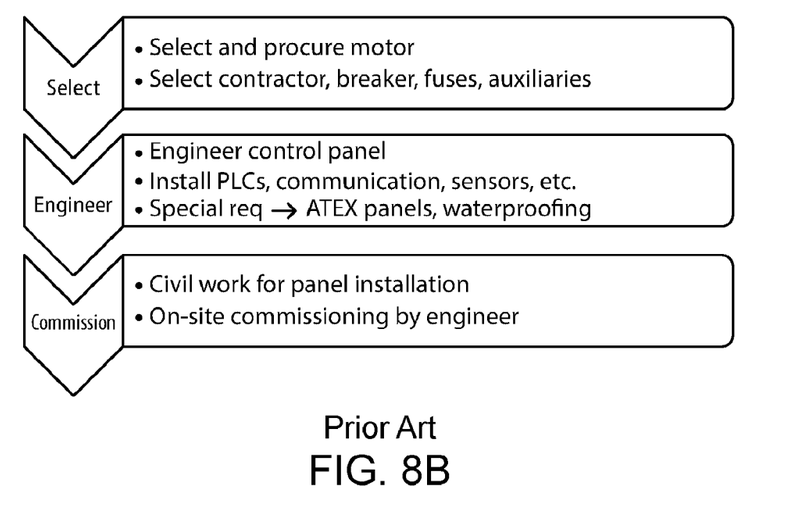

Turning to FIGS. 8 and 9, an improved industrial plant system may also be provided, including an improved way to design, install and maintain the power equipment in the plant, such as motors 56 (i.e., electrical loads 56) for motion (e.g., conveyors 58), ventilation (e.g., fans 60), compressors and pumps. In order to use a motor 56, multiple functionalities are typically provided, including electrical protection (e.g. circuit breakers or fuses), control (e.g., contactors), safety (e.g., disconnect switch with log out tag out capability) and communication (e.g., PLCs). A conventional electrification arrangement for an industrial plant system is shown in FIG. 8A with significant steps required to install a motor in the system listed in FIG. 8B. Traditional installation of motors 56 and other controlled power equipment in an industrial plant requires engineering of equipment/motor control panels 52 with control and protection devices coordinated with the specific equipment. Main power is typically provided from a power distribution panel 50 to the control panel 52. Separate controlled power cables 54 are then routed for each motor 56 from the control panel 52 to each motor 56. Moreover, equipment/motor control panels 52 and controlled power cables 54 need to be installed for each motor/equipment 56. Depending on the industry, this might require running controlled power cables 54 in water tight, or impact resistant conduits, wash-down conduits and enclosures, or wash-down power plugs with different levels of IP ingress protection. In conventional systems, plant design engineers must select each component so that selected components are not only compatible with the particular application but are also compatible with each other. Further, individual components may have different set-points (e.g., trip levels for circuit breakers, overload trip levels, etc.) which need to be selected appropriately. This makes the task of installing, commissioning or modifying an industrial plant extremely complicated, requiring significant time and effort from trained engineers. The engineering and lead time costs can significantly outweigh the equipment costs, especially in developed economies. Thus, traditional electrification arrangements involve significant capital expenditures and time and labor to install. Also, the result of such a conventional electrification arrangement is specific to a given arrangement and limits future operational flexibility.

Figure 9A:
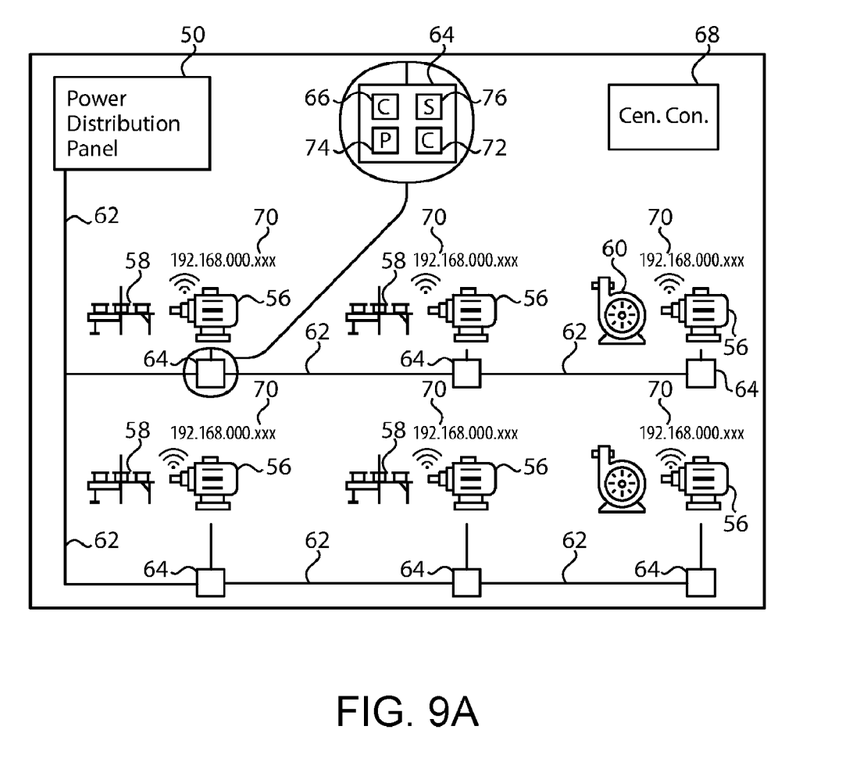
FIGS. 9A-B are schematics of an improved electrification arrangement in an industrial plant and typical steps involved in adding a motor to such an arrangement.
Figure 9B:
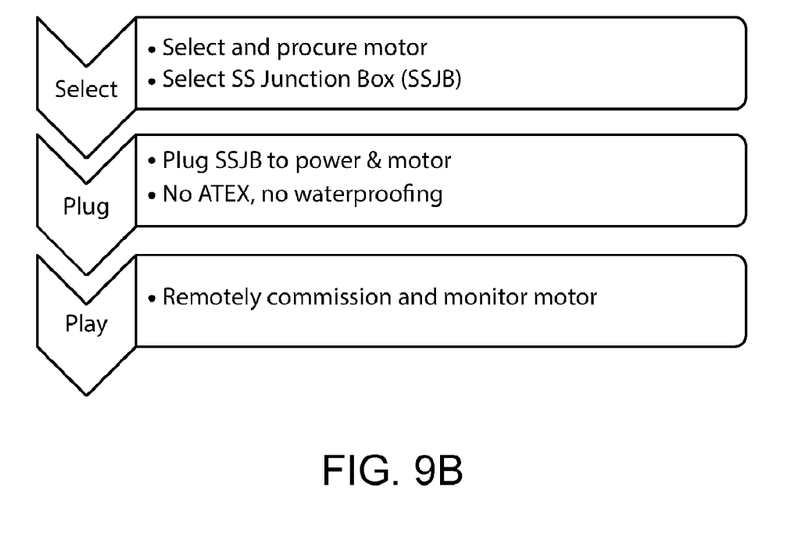

On the other hand, an improved electrification arrangement is shown in FIG. 9A with significant steps required to install a motor 56 in the system listed in FIG. 9B. Motors 56 and equipment connected to a power distribution line 62 (bus duct, cable tray, etc.) (i.e., power supply bus 62) through a smart connection box or plug 64 with Integrated Control, Protection, and Communication (ICPC) may be useful in simplifying the engineering, installation, operating and the monitoring of such equipment 56. Thus, equipment/motor control panels 52 may no longer be necessary since the control and protection is collocated with the equipment 56 itself or in proximity of the equipment 56. Running separate control and power cables 54 in conduits from the motor control panel 52 is also no longer necessary since the equipment 56 can be directly connected to the power distribution lines 62. By including an embedded local controller 66, the equipment 56 can be identified with a unique identifier 70, such as an IP address 70 or software identification, rather than with a dedicated power cable 54 from the dedicated control panels 52. Thus, each smart connector 64 may also communicate with a central controller 68 using an onboard communications module 72 and the unique identifier 70. Each smart connector 64 also includes electrical protection 74, such as a circuit breaker 74, that limits electric current to the respective motor 56. Preferably, each smart connector 64 also includes a safety disconnect 76 to manually disconnect the respective motor 56 from the power supply bus 62 in order to safely perform maintenance on the motor 56.

In the improved system, equipment may be identified by the embedded controller with integrated control, protection, and monitoring functions. Equipment may also be controlled, monitored and protected directly at the equipment level using modern communication technologies (ethernet, wi-fi, 5G and similar). Process sensing may also be collected and distributed electronically so that control cabling may not need to be reconfigured when power equipment is reconfigured. Short circuit incident energy and the arc flash hazard area may also be reduced around the equipment thanks to immediate protection at the circuit level or equipment level. Reconfiguration of a plant may also be done without the need for new engineering since the equipment can be connected directly to the power lines or power distribution duct and identification happens through software identification/addressed (e.g., IP address). It may also be possible to use remote reconfiguration and remote troubleshooting of the system. The number of individual conduits and circuits may also be reduced.

Figure 10A:
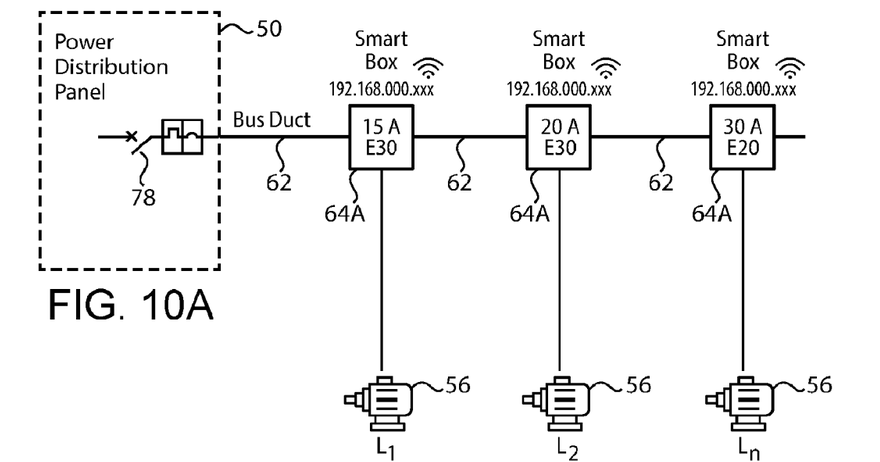
FIGS. 10A-C are schematics of alternative locations for smart connectors.
Figure 10B:
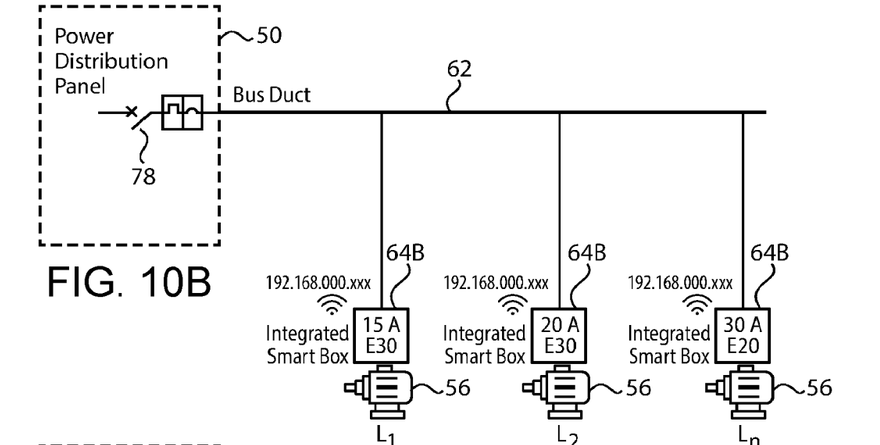
Figure 10C:
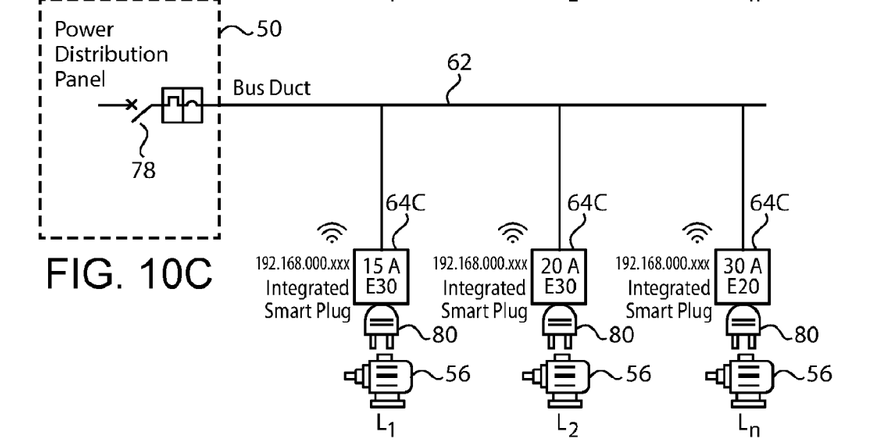

Alternative arrangements of the smart connectors 64 are shown in FIGS. 10A-10C. As shown, electrical power may be supplied to the power supply bus 62 from a power distribution panel 50. The electrical supply provided on the power supply bus 62 will typically be AC power and may be three-phase AC power. A main breaker 78 may be provided in the power distribution panel 50 to control the total available electrical power provided to the power supply bus 62. Unlike conventional electrification arrangements, the total available electrical power is all along the power supply bus 62 to each of the motors 56. That is, separate cables 54 running from a motor control panel 52 which limits the electrical power to each cable 54 are not needed. Instead, the supply bus 62 is connected in series to the smart connectors 64 and motors 56. As shown in FIG. 9A, the power supply bus 62 may also have multiple branches where the smart connectors 64 and motors 56 are connected in series along each branch of the bus 62. Thus, in the improved electrification arrangement, a motor 56 can be installed anywhere along the power supply bus 62 and the total available electrical power supplied to the bus 62 will already be available to the new motor 56. A smart connector 64 is also connected between the power supply bus 62 and each of the motors 56. As noted above, each smart connector 64 provides multiple functions, including for example, electrical protection 74 which limits the supply of the total available electrical power from the power supply bus 62 to the respective motor 56, and a local controller 66 with a unique identifier 70 that communicates with the central controller 68 with a communications module 72 using the unique identifier 70 to control the supply of electrical power from the bus 62 to the respective motor 56. Communication with the central controller 68 may be through a communication channel within the power supply bus 62 (e.g., a data line running alongside power electrical cables) or may be done wirelessly (e.g., using wi-fi). In FIG. 10A, the smart connectors 64 may be boxes 64A (e.g., smart junction boxes) that are connected in series to the bus 62. Each smart box 64A is then connected to its respective motor 56 with a power cable at least three feet long. In FIG. 10B, the smart box 64B may be physically attached to its respective motor 56, for example, by being mounted onto the motor housing. In FIG. 10C, the smart connector 64C may be housed within an electrical plug 80 at the end of the power cable connected to the respective motor 56. It is understood that the power cable 10 described above could also be used with the added control, protection and communication capabilities of the smart connector 64.

A variety of methods for the energization and operation of electrical loads in such an electrification arrangement are possible. For example, it may be possible for an electrical load to be provided with electrical power merely be connecting an electrical load to the power supply bus through a smart connector.

Communication may also be established between the central controller (PLC or DCS or Cloud) and the smart connector, which may include notifying the central controller of the motor location or that the motor functionality has changed. Once the smart connector gets an ON command from the central controller, the smart connector may perform process compatibility and safety checks to ensure motor is properly connected and may give a visual and/or audio indication that the motor is starting and start the motor. If the smart connector fails the process compatibility and safety checks, the smart connector may notify the central controller (PLC or DCS or Cloud). If the smart connector fails a communication check/handshake with the central controller or the motor, no voltage/power may be provided to the electric motor (lock out) and may notify the central controller. The smart connector may also handle transients, such as inrush currents, faults, etc. Detected faults may be handled locally by the electrical protection and communicated to the central controller and to protections upstream (e.g., an upstream breaker). Overcurrents and overloads may also be handled locally by the electrical protection and communicated to the central controller and upstream protection. Unexpected inrush transients may also be handled locally through active current limitation (i.e., the electrical protection in the smart connector) and communicated to the central controller and upstream protection. Voltage sag transients, blackouts, and black starts may be handled in a similar manner.

Figure 11A:
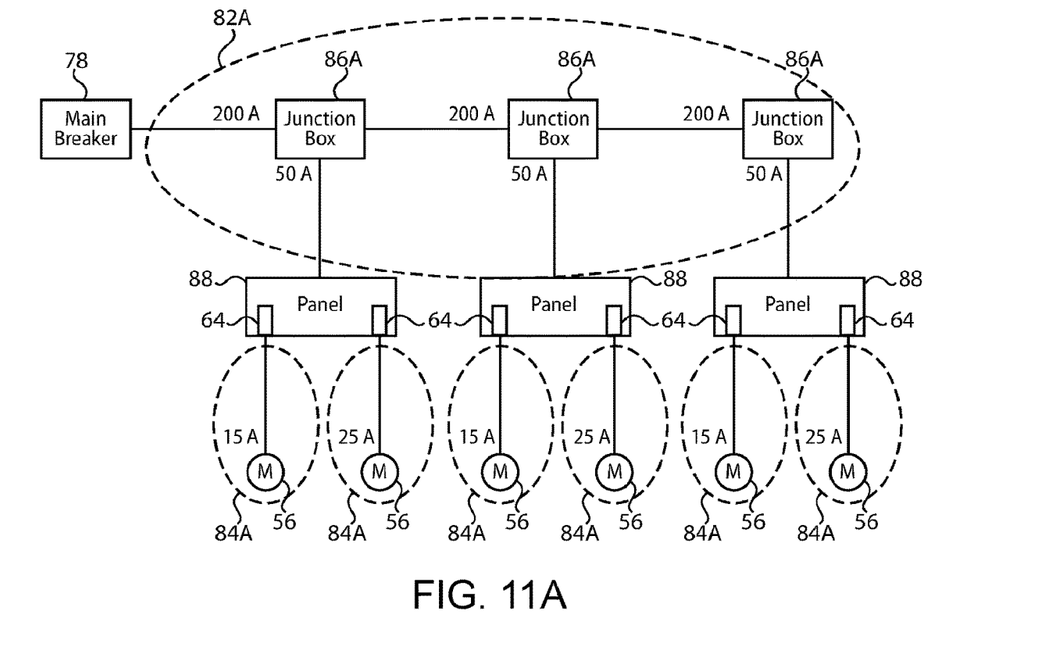
FIGS. 11A-B are schematics of alternative protection zones using the smart connectors.
Figure 11B:
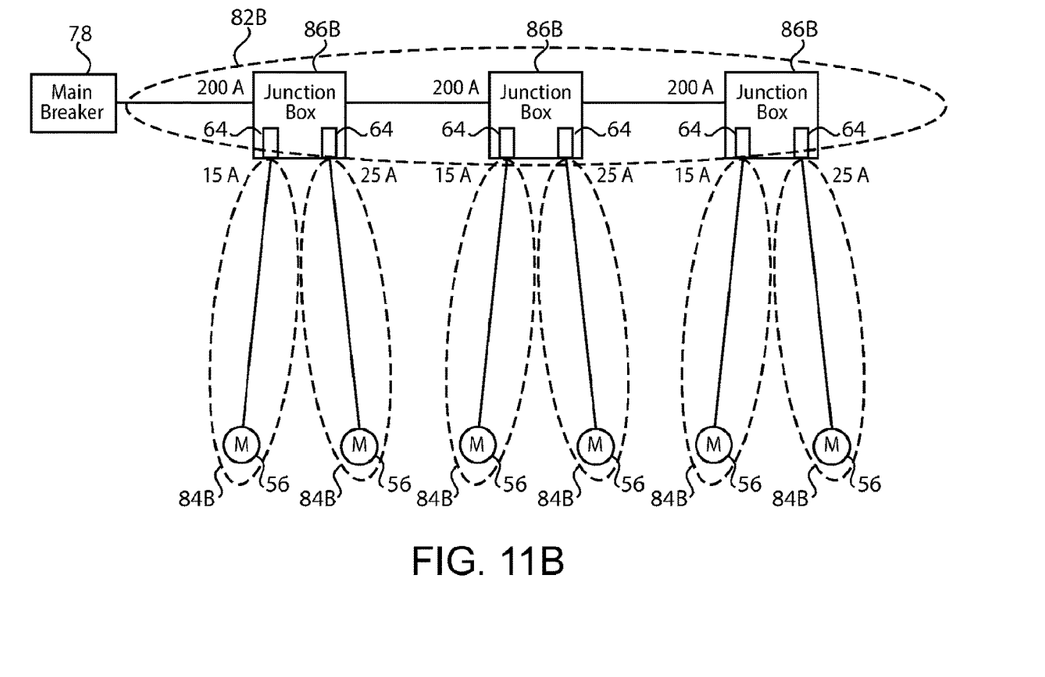

Additionally, the plug and play plant electrification arrangements allow easy protection coordination with an upstream main breaker 78, which may be electro-mechanical or hybrid or solid-state. For example, in one arrangement shown in FIG. 11A, a first protection zone 82A is protected by the main breaker 78 and/or junction boxes 86A, and second protection zones for each motor 56 are protected by the respective smart connectors 64. In this arrangement multiple smart connectors 64 may be housed in a panel 88 to service multiple respective motors 56. In another arrangement shown in FIG. 11B, the first protection zone 82B is protected by the main breaker 78, and second protection zones for each motor 56 are protected by the respective smart connectors 64. In this arrangement multiple smart connectors 64 may be housed in each junction box 86B to service multiple respective motors 56.

As described, the improved electrification arrangement allows identification by an embedded local controller with control, protection and monitoring functions. Equipment control, monitoring and protection are also possible directly at the equipment level by means of modern communication technologies (e.g., Ethernet, 2 wire Ethernet, fiber optic, wi-fi, 5G and similar). Plug and play plant electrification allows reduced engineering and labor in order to install the system and when adding new equipment. Further, the complexity of the power system of a plant is reduced. Installation time and cost may also be reduced. The space occupied by power control panels may also be reduced. Short circuit incident energy and arc flash hazard areas around equipment may also be reduced due to immediate protection at the equipment level. Engineering-less and flexible reconfiguration of the plant may also be possible, since the equipment can be connected directly to the power lines and identification may happen through software identification/addressing (e.g., IP address). The smart connectors provide integrated control, protection & communication (ICPC) between the power supply bus and the respective equipment. The smart connector may be integrated at the equipment level (e.g., inside the equipment or at the connection of the equipment). The smart connector may also be integrated in a smart plug (e.g., at the bus/junction box side or at the equipment side). Equipment control, monitoring and protection may also be provided directly at the equipment level by means of modern communication technologies (e.g., Ethernet, 2 wire Ethernet, fiber optic, wi-fi, 5G and similar). The equipment may also be identified through the smart connector. A switch, such as a solid state switch or contactor, may be used in the smart connector to control operation of the equipment by connecting and disconnecting the power supply bus to and from the equipment in response to a central controller. The local controller may also start and stop operation of the equipment (i.e., electrical load) in response to sensor inputs, may reverse the operating direction of the equipment, soft start the equipment, limit inrush current to the equipment, perform safety stops of the equipment, control the efficiency of the equipment, provide temporary load curtailment or provide load balancing. The electrical protection may be a circuit breaker which limits electric current supplied to the equipment. The electrical protection may also provide short circuit fault protection, overload protection, thermal protection, vibration protection or locked rotor protection. Identification and location may use the communication module and a TCP IP address, MQTT broker messages or MODBUS, etc.

While preferred embodiments of the inventions have been described, it should be understood that the inventions are not so limited, and modifications may be made without departing from the inventions herein. While each embodiment described herein may refer only to certain features and may not specifically refer to every feature described with respect to other embodiments, it should be recognized that the features described herein are interchangeable unless described otherwise, even where no reference is made to a specific feature. It should also be understood that the advantages described above are not necessarily the only advantages of the inventions, and it is not necessarily expected that all of the described advantages will be achieved with every embodiment of the inventions. The scope of the inventions is defined by the appended claims, and all devices and methods that come within the meaning of the claims, either literally or by equivalence, are intended to be embraced therein.

The invention claimed is:

1. An electrical power cable, comprising:
   a first end, a second end and an elongated length extending between the first end and the second end;
   a power electrical conductor extending between the first end and the second end;
   a first electrical contact at the first end configured to conduct electrical power from a power source to the power electrical conductor;
   a second electrical contact at the second end configured to conduct the electrical power from the power electrical conductor to an electrical load;
   a switch disposed in the second end between the power electrical conductor and the second electrical contact;
   a relay disposed in the second end, the relay closing the switch to conduct the electrical power from the power electrical conductor to the second electrical contact, and the relay opening the switch to leave the second electrical contact electrically uncharged, and
   a third electrical contact at the second end configured to control a relay when the second end is connected to the electrical load;
   wherein the third electrical contact connects with the electrical load after the second electrical contact connects with the electrical load.

2. The electrical power cable according to claim 1, further comprising a plurality of the power electrical conductor, each of the plurality of power electrical conductors being for one electrical phase, one of the switch being disposed in the second end between each of the plurality of the power electrical conductors and respective second electrical contacts, wherein one or more of the relay closes the switches to conduct the electrical power from each of the plurality of the power electrical conductors to the respective second electrical contacts when the second end is connected to the electrical load, and the one or more relay opens the switches to leave the respective second electrical contacts electrically uncharged when the second end is disconnected from the electrical load.

3. The electrical power cable according to claim 1, wherein the relay is powered by the electrical power conducted through the power electrical conductor.

4. The electrical power cable according to claim 1, further comprising a data line extending between the first end and the second end, the relay being controlled in response to data exchanged between the power source and the electrical load through the data line.

5. The electrical power cable according to claim 1, further comprising a wireless receiver in the second end, the relay being controlled in response to a control signal received by the wireless receiver.

6. The electrical power cable according to claim 1, further comprising a control line extending from the first end to the relay, the relay being controlled in response to a control signal sent by the power source through the control line.

7. The electrical power cable according to claim 1, wherein the relay is an electromechanical relay.

8. The electrical power cable according to claim 1, wherein the relay is a solid state relay.

9. The electrical power cable according to claim 1, wherein the electrical power cable conducts between 1 and 400 amps of electrical power from the power source to the electrical load.

10. The electrical power cable according to claim 9, wherein the electrical power cable conducts between 20 and 200 amps of electrical power from the power source to the electrical load.

11. The electrical power cable according to claim 1, wherein the second end comprises a molded body embedding the switch and the relay therein.

12. The electrical power cable according to claim 1, wherein the second electrical contact is a pin or receptacle laterally surrounded by an insulating sleeve.

13. The electrical power cable according to claim 1, wherein the relay closes the switch to conduct the electrical power from the power electrical conductor to the second electrical contact when the second end is connected to the electrical load, and the relay opens the switch to leave the second electrical contact electrically uncharged when the second end is disconnected from the electrical load.

14. An electrical power supply arrangement, comprising the electrical power cable according to claim 1 connected to the power source at the first end and connected to the electrical load at the second end.

15. The electrical power cable according to claim 1, wherein the electrical power cable conducts between 20 and 200 amps of electrical power from the power source to the electrical load, and the second end comprises a molded body embedding the switch and the relay therein.

16. The electrical power cable according to claim 15, further comprising a third electrical contact at the second end configured to control the relay when the second end is connected to the electrical load.

17. The electrical power cable according to claim 16, wherein the relay is a solid state relay.

18. The electrical power cable according to claim 17, wherein the relay is powered by the electrical power conducted through the power electrical conductor, and further comprising a plurality of the power electrical conductor, each of the plurality of power electrical conductors being for one electrical phase, one of the switch being disposed in the second end between each of the plurality of the power electrical conductors and respective second electrical contacts, wherein one or more of the relay closes the switches to conduct the electrical power from each of the plurality of the power electrical conductors to the respective second electrical contacts when the second end is connected to the electrical load, and the one or more relay opens the switches to leave the respective second electrical contacts electrically uncharged when the second end is disconnected from the electrical load.

19. An electrical power cable, comprising:
a first end, a second end and an elongated length extending between the first end and the second end;
a power electrical conductor extending between the first end and the second end;
a first electrical contact at the first end configured to conduct electrical power from a power source to the power electrical conductor;
a second electrical contact at the second end configured to conduct the electrical power from the power electrical conductor to an electrical load;
a switch disposed in the second end between the power electrical conductor and the second electrical contact;
a relay disposed in the second end, the relay closing the switch to conduct the electrical power from the power electrical conductor to the second electrical contact, and the relay opening the switch to leave the second electrical contact electrically uncharged; and
a data line extending between the first end and the second end, the relay being controlled in response to data exchanged between the power source and the electrical load through the data line.

20. An electrical power cable, comprising:
a first end, a second end and an elongated length extending between the first end and the second end;
a power electrical conductor extending between the first end and the second end;
a first electrical contact at the first end configured to conduct electrical power from a power source to the power electrical conductor;
a second electrical contact at the second end configured to conduct the electrical power from the power electrical conductor to an electrical load:
a switch disposed in the second end between the power electrical conductor and the second electrical contact;
a relay disposed in the second end, the relay closing the switch to conduct the electrical power from the power electrical conductor to the second electrical contact, and the relay opening the switch to leave the second electrical contact electrically uncharged; and
a control line extending from the first end to the relay, the relay being controlled in response to a control signal sent by the power source through the control line.

* * * * *